United States Patent
Cheung

(10) Patent No.: US 9,804,058 B2
(45) Date of Patent: Oct. 31, 2017

(54) METHOD OF FACILITATING VISUAL DETECTION OF A CRACK IN A COMPONENT OF A GAS TURBINE ENGINE

(71) Applicant: Pratt & Whitney Canada Corp., Longueuil (CA)

(72) Inventor: Kin-Leung Cheung, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 262 days.

(21) Appl. No.: 14/191,689

(22) Filed: Feb. 27, 2014

(65) Prior Publication Data
US 2015/0241309 A1    Aug. 27, 2015

(51) Int. Cl.
*G01M 15/14* (2006.01)
*C23C 28/00* (2006.01)
(Continued)

(52) U.S. Cl.
CPC .......... *G01M 15/14* (2013.01); *C23C 4/073* (2016.01); *C23C 28/00* (2013.01); *C23C 28/021* (2013.01); *C23C 28/022* (2013.01); *C23C 28/042* (2013.01); *C23C 28/30* (2013.01); *C23C 28/32* (2013.01); *C23C 28/3215* (2013.01); *C23C 28/44* (2013.01); *F01D 5/28* (2013.01);
(Continued)

(58) Field of Classification Search
CPC ..... C23C 28/021; C23C 28/022; C23C 28/00; C23C 28/042; C23C 28/30; C23C 28/32; C23C 28/321; C23C 28/3215; C23C 28/44; C23C 30/00; C23C 30/005; C23C 4/073
See application file for complete search history.

(56) References Cited

U.S. PATENT DOCUMENTS 3,530,045 A   9/1970   Alburger
3,744,295 A   7/1973   Allinikov
(Continued)

OTHER PUBLICATIONS

Harris et al. In "MAR M 247 Derivations—CM 247 LC DS Alloy CMSX Single Crystal Alloys Properties and Performance" reprinted from Superalloys 1984, Proceedings of the Fifth Int'l Symposium on Superalloys . . . , eds. M. Gell et al. (Oct. 1984) (eleven pages).*
(Continued)

*Primary Examiner* — Michael E La Villa
(74) *Attorney, Agent, or Firm* — Norton Rose Fulbright Canada LLP

(57) ABSTRACT

A component of a gas turbine engine comprises a substrate, a corrosion resistant top layer, and an intermediate corrodible layer disposed between the corrosion resistant top layer and the substrate. When corroding, the intermediate layer has a color contrasting with a color of the top layer. A method of detecting a crack when it penetrated the top layer in a component of a gas turbine engine having a corrosion resistant top layer and an intermediate corrodible layer comprises, in sequence, observing that at least one area of the component has a color contrasting with that of the top layer; determining that the color of the at least one area is a result of corrosion of the intermediate corrodible layer; and determining that the top layer has a crack as a result of determining corrosion of the intermediate layer. A method of facilitating crack detection in a component is also presented.

9 Claims, 3 Drawing Sheets

(51) Int. Cl.
    *C23C 28/02* (2006.01)
    *F01D 5/28* (2006.01)
    *C23C 28/04* (2006.01)
    *C23C 4/073* (2016.01)
(52) U.S. Cl.
    CPC ............ *F01D 5/282* (2013.01); *F01D 5/284* (2013.01); *F01D 5/286* (2013.01); *F01D 5/288* (2013.01); *F05D 2260/80* (2013.01)

(56) References Cited

U.S. PATENT DOCUMENTS

| | | | |
|---|---|---|---|
| 4,063,644 A | 12/1977 | Hoffman et al. | |
| 4,332,646 A | 6/1982 | Tsurumaru et al. | |
| 5,427,866 A * | 6/1995 | Nagaraj | B32B 15/01 |
| | | | 416/241 B |
| 5,554,318 A | 9/1996 | Neumann et al. | |
| 5,699,153 A | 12/1997 | Takamoto et al. | |
| 6,062,811 A | 5/2000 | Zombo et al. | |
| 6,228,445 B1 * | 5/2001 | Tverberg | C23C 22/50 |
| | | | 428/34.4 |
| 6,626,047 B1 | 9/2003 | Vetterlein | |
| 6,644,917 B2 | 11/2003 | Zhao et al. | |
| 6,974,641 B1 | 12/2005 | Choy et al. | |
| 7,052,737 B2 | 5/2006 | Kool et al. | |
| 7,097,783 B2 | 8/2006 | Wayte | |
| 7,667,834 B2 | 2/2010 | Clasen | |
| 7,690,840 B2 | 4/2010 | Zombo et al. | |
| 7,732,056 B2 | 6/2010 | Bhatnagar et al. | |
| 8,158,428 B1 | 4/2012 | Krishna et al. | |
| 8,247,080 B2 | 8/2012 | Iacovangelo et al. | |
| 2004/0048090 A1 * | 3/2004 | Creech | C23C 4/18 |
| | | | 428/621 |
| 2005/0254955 A1 * | 11/2005 | Helder | B23K 20/122 |
| | | | 416/233 |
| 2006/0265926 A1 * | 11/2006 | Sietsema | F41A 21/04 |
| | | | 42/76.02 |

OTHER PUBLICATIONS

ArcelorMittal, "Stainless Steel and Corrosion," downloaded from http://www.aperam.com/uploads/stainlesseurope/Brochures/Leaflet%20corrosion_Eng_374Ko.pdf on Apr. 17, 2017, 6 pages (no date).*

* cited by examiner

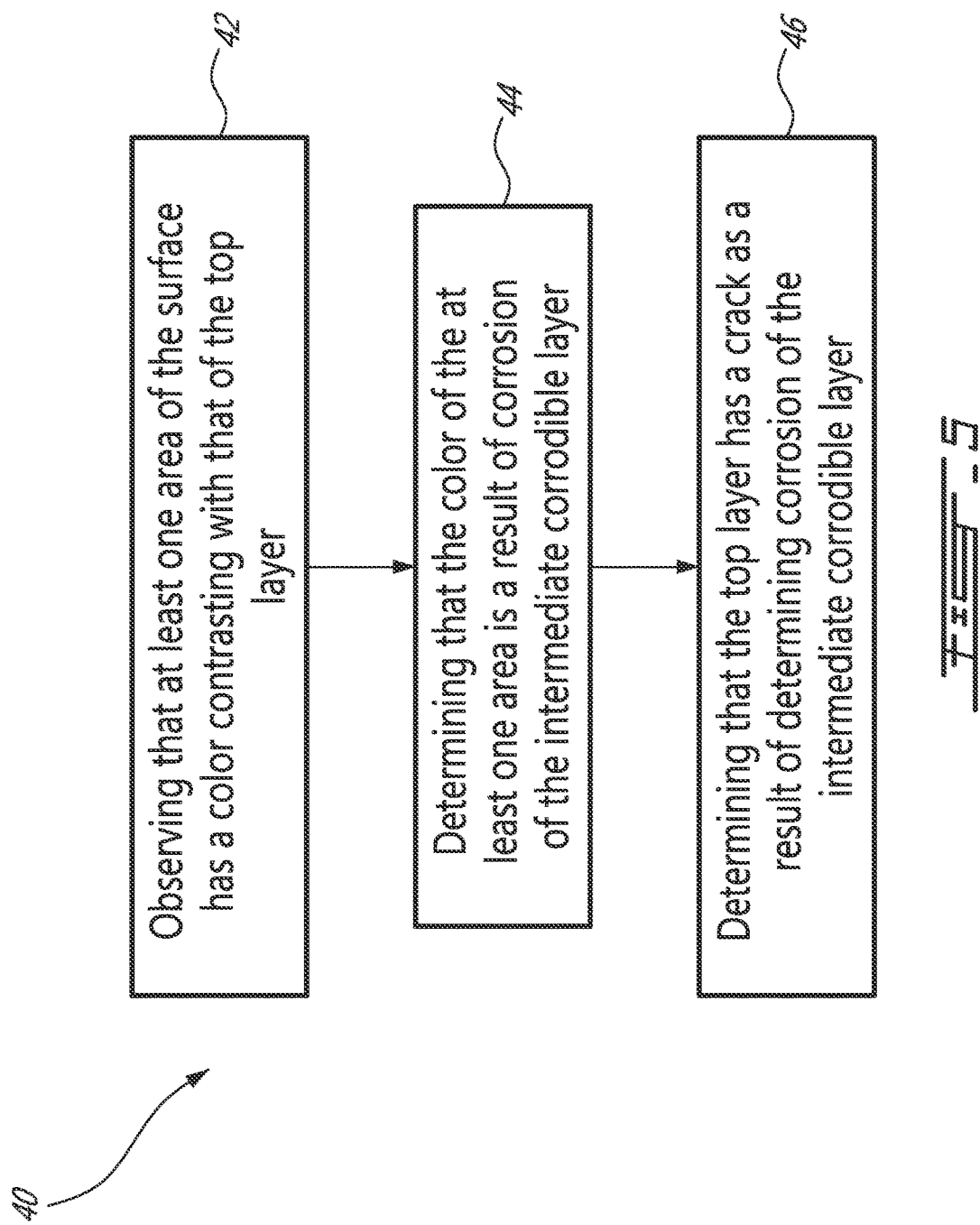

METHOD OF FACILITATING VISUAL DETECTION OF A CRACK IN A COMPONENT OF A GAS TURBINE ENGINE

TECHNICAL FIELD

The application relates generally to components of gas turbine engines and more specifically to detection of cracks in those components.

BACKGROUND OF THE ART

Parts of a gas turbine engine can become scratched or cracked by normal wear, stress loading, or by incident such as foreign object impact at high velocity. Some of the parts of the gas turbine engine are made of a substrate and of at least one coating over the substrate. Cracks in the coating can expose the substrate, which in turn can leave the component vulnerable to stress fractures, such as stress corrosion cracks whereby in the presence of stress and corrosion the component would crack and fracture at a stress level below the tensile strength of the substrate.

SUMMARY

In one aspect is provided a component of a gas turbine engine, the component comprising: a substrate; a corrosion resistant top layer; and an intermediate corrodible layer disposed between the corrosion resistant top layer and the substrate, when corroding, the intermediate layer having a color contrasting with a color of the top layer.

In another aspect is provided method of detecting a crack in a component of a gas turbine engine having a corrosion resistant top layer and an intermediate corrodible layer, the method comprising, in sequence: observing that at least one area of the component has a color contrasting with that of the top layer; determining that the color of the at least one area is a result of corrosion of the intermediate corrodible layer; and determining that the top layer has a crack therethrough as a result of determining corrosion of the intermediate corrodible layer.

In yet another aspect, there is provided a method of facilitating crack detection in a component of a gas turbine engine, the method comprising: obtaining a substrate of the component; depositing an intermediate corrodible layer onto the substrate; and depositing a corrosion resistant top layer onto the intermediate corrodible layer, wherein when a crack in the top layer exposes the intermediate corrodible layer, the corroded intermediate layer corroding in a color contrasting with a color of the top layer.

DESCRIPTION OF THE DRAWINGS

Reference is now made to the accompanying figures in which:

FIG. 5 is a flow chart of a method of detecting a crack such as the crack in the component of FIG. 3.

DETAILED DESCRIPTION

Figure 1:
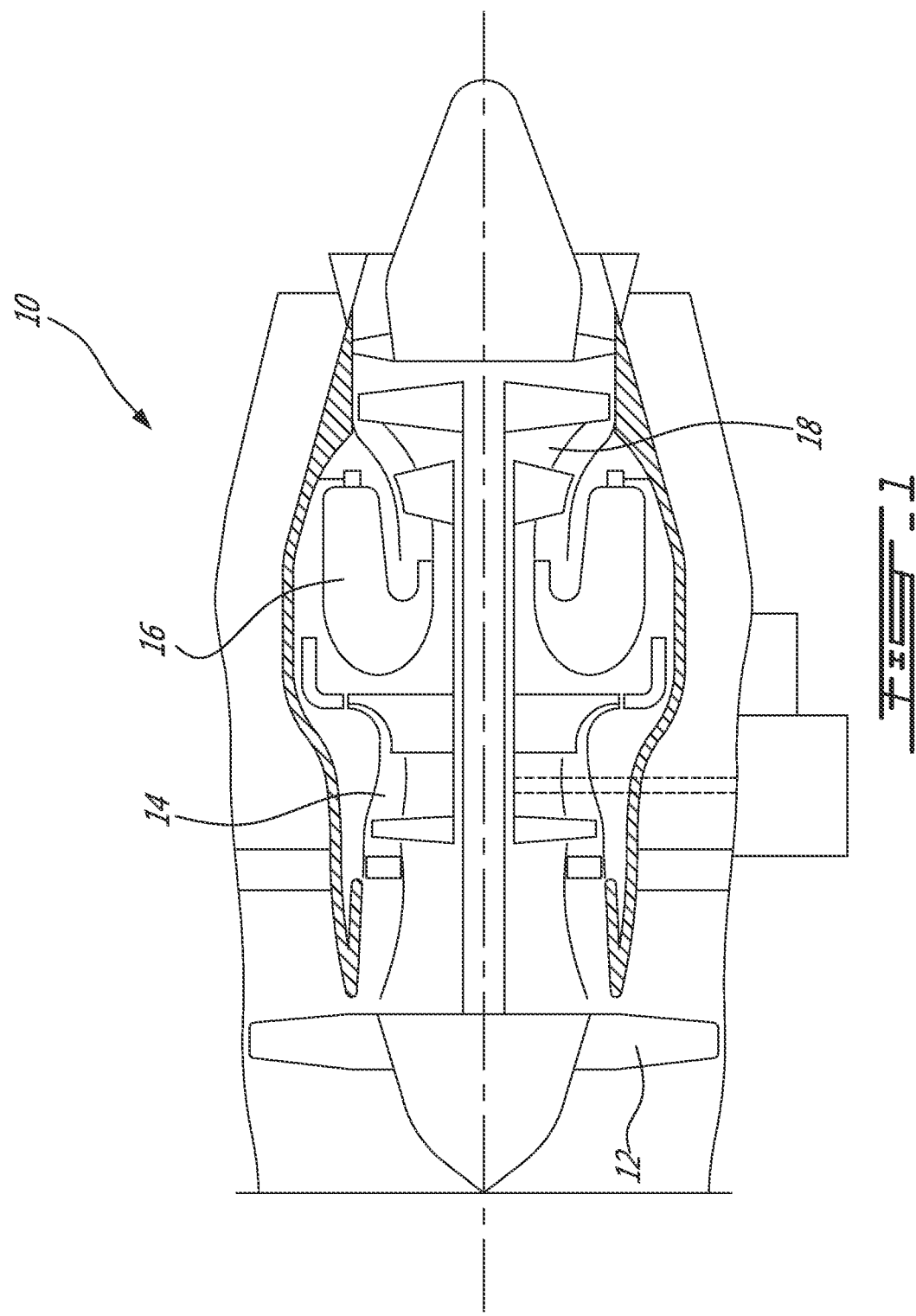
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
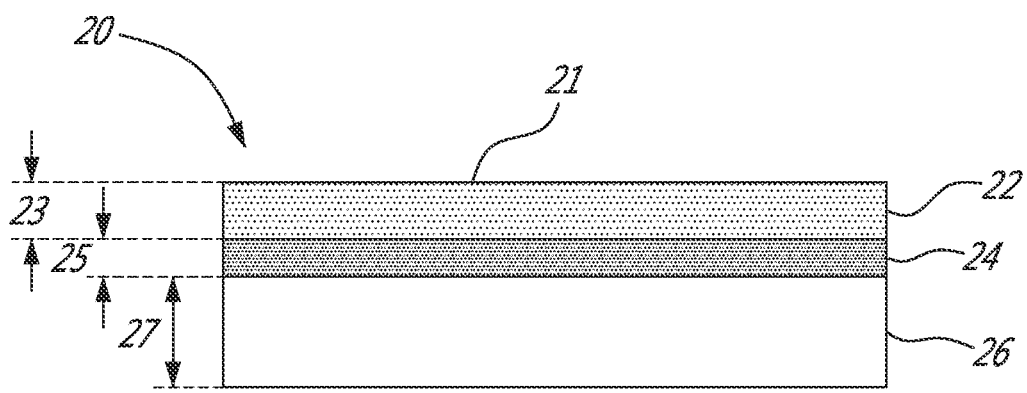
FIG. 2 is a schematic cross-section view of a component of the gas turbine engine of FIG. 1 having a substrate, a corrosion resistant top layer and an intermediate corrodible layer.

Referring to FIG. 2, a component 20 of the gas turbine engine 10 includes a corrosion resistant top layer 22 and a substrate 26. An intermediate corrodible layer 24 is disposed between the substrate 26 and the top layer 22 and allows detecting cracks in the top layer 22 before the substrate 26 becomes exposed.

The component 20 can be used in various parts of a gas turbine engine. In one embodiment, the substrate 26 is an aluminum alloy, the intermediate layer 24 a ferrous alloy and the top layer 22 a metal plating of cobalt. The component 20 may be coated, plated, or the like. The substrate 26, the intermediate layer 24, and the top layer 22 may be various materials depending of the intended use of the component 20. Examples of materials for the top layer 22 include non-exhaustively a metal alloy, and a non-metal. Yet, for any choice of the top layer 22, intermediate layer 24 and substrate 26, the top layer 22 is chosen to be corrosion resistant and the intermediate layer 24 to be corrodible. The substrate 26, however, may or may not be corrosion resistant. In addition, the intermediate layer 24 is selected to have a corroded color contrasting with that of the top layer 22 for allowing visual detection of cracks of the top layer 22, as will be described below. By "contrasting", it should be understood any color difference which would be detectable without confusion by a normal healthy human eye. Examples of color contrasting include a dark color over a light background, a vivid color over a pastel background. Colors that could not be easily dateable such as green over red for daltonians are preferably avoided. In one embodiment where the top layer 22 is cobalt and the substrate 26 is aluminum, the top layer 22 has a generally light grey color and the substrate 26 has a generally silver to dull grey color, and a crack in the top layer 22 may be difficult to detect during visual inspection. The presence of the intermediate layer 24 having a corroded color contrasting with that of the top layer 22 facilitates visual detection of cracks in the top layer 22. Cracks are undesirable because they may lead to fracture of the component 20. For example, the substrate 26 and the top layer 22 may not be galvanic compatible, and if the top layer 22 is scratched and the substrate 26 exposed, a fluid could involuntary connect the substrate 26 to the top layer 22 and cause galvanic corrosion. It is therefore undesirable to leave the component 20 with a portion of the substrate 26 exposed. Exposing involuntarily a portion of the substrate 26 could also cause stress corrosion cracking thereby inducing potentially cracking and fracture of the component 20 at a lower stress level than it otherwise would.

In the embodiment described herein, the top layer 22 and the intermediate layer 24 may be formed by a specific electrolytic deposition to deposit metal to a grain size in the nanometer range, for example 10 to 15 nanometers. However, the top layer 22 and the intermediate layer 24 may be formed using plating techniques other than the above described electrolytic deposition process, and the cobalt grain size of the top layer 22 and/or the ferrous grain size of the intermediate layer 24 used in the electrolytic process may have a grain size other than in the nanometer size range. The top layer 22 and/or intermediate layer 24 may also not be plated.

The top layer 22 has a thickness 23, the intermediate layer 24 has a thickness 25 and the substrate 26 has a thickness 27. FIG. 2 is schematic and the top layer 22, intermediate layer 24 and substrate 26 may have dimensions relative to each other different than the ones shown in FIG. 2. For example, the intermediate layer 24 may be thicker than the top layer 22.

Figure 3:
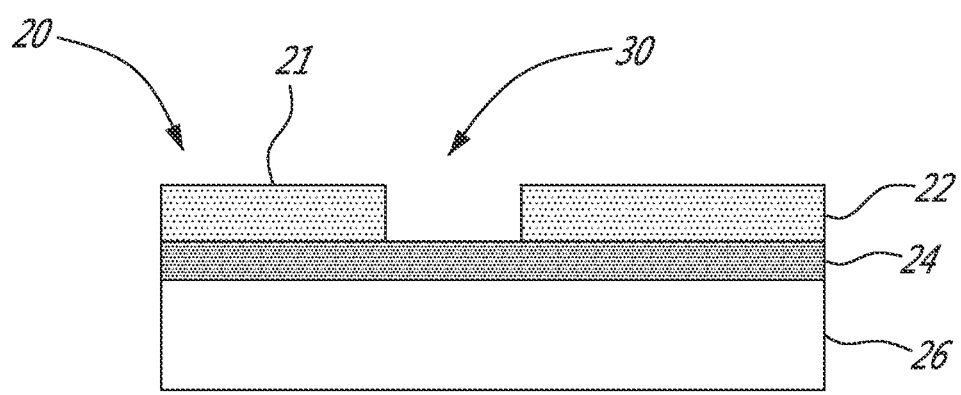
FIG. 3 is a schematic cross-section view of the component of FIG. 2 showing a crack penetrated through the top layer.

FIG. 3 schematically shows the component 20 having a crack 30 in the top layer 22. The crack 30 could originate from various events, including normal wear, stress loading, or foreign object impact at high velocity. The crack 30 extends through the thickness 23 of the top layer 22 and exposes the intermediate layer 24. FIG. 3 is schematic, and the crack 30 may have other shapes and dimensions as the ones shown in FIG. 3. For example, the crack 30 could be linear shaped or non linear shaped. The crack 30 may also extend through a portion of the intermediate layer 24 before exposing the substrate 26.

The intermediate layer 24 is a corrodible material selected to have a corrosion color contrasting with that of the top layer 22 in order to enhance visual detection of the crack 30. In the example described herein, the intermediate layer 24 is a ferrous alloy and corrodes in a generally red color. One example of a ferrous alloy is an alloy of 75 to 80% iron by weight. When corroding, the ferrous alloy turns into a red color, while the top layer 22 remains grey. As a consequence, a user inspecting the component 20 would visually detect the red areas. Knowing that the red areas are a consequence of corrosion of the intermediate layer 24 (as opposed to areas of different color not related to the crack detection described herein), the user can deduce that these areas or stains are locations where a crack is present and that the crack 30 had penetrated through the thickness of the top layer 22 which may cause the component 20 to be subject to retirement from the engine 10. In one embodiment, the thickness 25 of the intermediate layer 24 is selected so that the crack 30 would not propagate through the thickness 25 of the intermediate layer 24 of the component 20 and would not reach the substrate 26 for at least two scheduled inspection intervals. This could correspond to 1,500 to 3,000 hours of engine operation. The component 20 could then be able to have a margin of safety to operate to the second scheduled inspection knowing the crack 30 would not be able to reach and expose the substrate 26 to corrosion and stress corrosion if the crack 30 misses detection at the first scheduled inspection. The thickness 25 of the intermediate layer 24 could be determined by crack propagation methodology. If the user detects no stains related to corrosion of the intermediate layer 24, the user deduces that no crack 30 is present or that the crack 30 is at an early stage and yet not penetrated through the thickness 23 of the top layer 22 that would otherwise makes the crack visually visible.

Depending on the choices of the top layer 22, intermediate layer 24 and substrate 26, the intermediate layer 24 can also act as a stiffener and supports structural loads for the component 20. In the example described herein, the ferrous alloy of the intermediate layer 24 is a stiffener and a structural load supporting element for the component 20 made of a cobalt top layer 22 and an aluminum alloy of the substrate 26. The intermediate layer 24 may not only serves to aid crack detection but also support the structural loads at the top layer 22 and the substrate 26 and provides stiffening to the component 20. A ferrous intermediate layer 24 tensile modulus and tensile strength may be respectively three times and over two times that of a high strength aluminum alloy of the substrate 26. It is contemplated that the intermediate layer 24 also acts to stiffen and strengthen the component 20.

Figure 4:
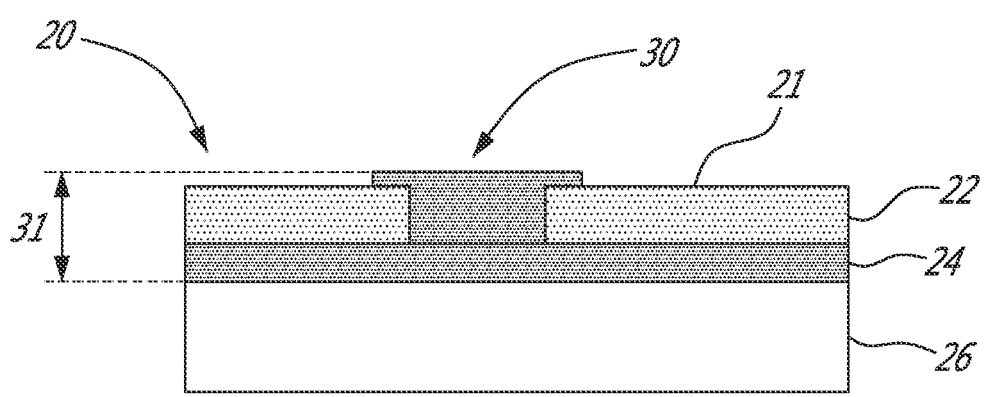
FIG. 4 is a schematic cross-section view of the component of FIG. 3 showing the corroded intermediate layer expanded through the crack in the top layer and partially covering a surface of the component.

Turning to FIG. 4, the corroded intermediate layer 24 may expand in the crack 30 through the top layer 22 which could further enhance visual detection of the crack 30. FIG. 4 is schematic, and the corroded intermediate layer 24 may expand more or less than shown in FIG. 4. For example, the corroded intermediate layer 24 may expand only partially in the crack 30 at onset of corrosion in the intermediate layer 24. In the schematic of FIG. 4, the corroded intermediate layer 24 is shown to completely fill crack 30 in the top layer 22 and onto a surface 21 of the component 20, but it contemplated that the corroded intermediate layer 24 could be contained within the crack 30 at the onset of corrosion in the intermediate layer 24.

Turning to FIG. 5, a method 40 of detecting the crack 30 that had penetrated the thickness 23 of the top layer 22 in the component 20 starts at step 42 with observing that at least one area of the component 20 has a color different from a rest of the top layer 22. In the example described herein, one may observe red color stains over a gray color background. From step 42, the method goes to step 44, where it is determined that the color is a result of corrosion of the intermediate layer 24. This can be achieved by knowing that the color is a typical color of corrosion of the intermediate layer or by sampling the corrosion residue and determining that it is indeed a product of the corrosion. From step 44, the method goes to step 46 where it is determined that the crack 30 had penetrated the top layer 22 as a result of determining corrosion of the intermediate corrodible layer 24.

A manufacturer of the component 20 of the gas turbine engine 10 may perform a method of facilitating crack detection by obtaining the substrate 26 of the component 20; depositing the intermediate corrodible layer 24 onto the substrate 26; and depositing the corrosion resistant top layer 22 onto the intermediate corrodible layer 26. When the crack 30 in the top layer 22 exposes the intermediate corrodible layer 24, the corroded intermediate layer 24 corrodes in the color contrasting with a color of the top layer 22.

The above described layered component and method allow detecting cracks that penetrated the top layer before the substrate becomes exposed by using an intermediate layer of corrodible material that has a corrosion color contrasting with that of the top layer. The intermediate layer corrodes at an accelerated rate from galvanic corrosion with the top layer thereby provides earlier crack warnings than it otherwise would. The substrate being susceptible to stress corrosion cracking, i.e. at the presence of both stress and corrosion, it may fail at a stress corrosion crack stress level below its ultimate tensile strength. Earlier crack detection is thus enabled which is desired since crack tip stress is lower for smaller cracks and cracks grows over time from repeated cyclic stressing. The above detection method does not require detection tools, and relies only on the visual detection of the stains which can be done during the routine checks. The better the contrast between the top layer and the corroded intermediate layer, the easier the visual detection. In addition, the intermediate layer may not be parasitic, but rather enhances the stiffness, strength, and fatigue endurance life of the component.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of facilitating crack detection in a component of a gas turbine engine, the method comprising:
   obtaining a substrate of the component;
   depositing an intermediate corrodible layer onto the substrate; and
   depositing a galvanically non-compatible corrosion resistant top layer onto the intermediate corrodible layer, wherein, when a crack in the top layer exposes the intermediate corrodible layer, the intermediate corrodible layer galvanically corrodes in a color contrasting with a color of the top layer facilitating visual crack detection.

2. The method as defined in claim 1, wherein depositing the intermediate corrodible layer onto the substrate comprises one of coating and plating the intermediate corrodible layer onto the substrate.

3. The method as defined in claim 1, wherein depositing the galvanically non-compatible corrosion resistant top layer onto the intermediate corrodible layer comprises one of coating and plating the galvanically non-compatible corrosion resistant top layer onto the intermediate corrodible layer.

4. The method as defined in claim 1, wherein depositing the galvanically non-compatible corrosion resistant top layer comprises depositing a metal top layer.

5. The method as defined in claim 1, wherein depositing the intermediate corrodible layer comprises depositing a ferrous intermediate corrodible layer.

6. The method as defined in claim 1, wherein when corroding occurs, the intermediate corrodible layer expands on corrosion.

7. The method as defined in claim 1, wherein providing the substrate comprises providing an aluminum alloy substrate.

8. The method as defined in claim 1, wherein depositing the intermediate corrodible layer onto the substrate includes stiffening and strengthening the component.

9. The method as defined in claim 1, wherein the intermediate layer is a structural load supporting element of the component.

* * * * *